United States Patent
Inoue

(10) Patent No.: US 10,891,096 B2
(45) Date of Patent: Jan. 12, 2021

(54) COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD PERFORMED BY COMMUNICATION DEVICE

(71) Applicant: Brother Kogyo Kabushiki Kaisha, Nagoya (JP)

(72) Inventor: Takuya Inoue, Nisshin (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 157 days.

(21) Appl. No.: 16/278,445

(22) Filed: Feb. 18, 2019

(65) Prior Publication Data

US 2019/0258441 A1    Aug. 22, 2019

(30) Foreign Application Priority Data

Feb. 19, 2018  (JP) .................. 2018-027327

(51) Int. Cl.
| | |
|---|---|
| *G06F 3/12* | (2006.01) |
| *H04W 12/00* | (2009.01) |
| *H04W 12/06* | (2009.01) |
| *H04L 29/06* | (2006.01) |

(52) U.S. Cl.
CPC .......... *G06F 3/1288* (2013.01); *G06F 3/1287* (2013.01); *G06F 3/1292* (2013.01); *H04L 63/0807* (2013.01); *H04L 63/10* (2013.01); *H04W 12/0023* (2019.01); *H04W 12/06* (2013.01)

(58) Field of Classification Search
None
See application file for complete search history.

(56) References Cited

U.S. PATENT DOCUMENTS

| | | | |
|---|---|---|---|
| 2006/0172730 A1* | 8/2006 | Matsuda | ............ H04N 1/32619 455/420 |
| 2008/0178265 A1* | 7/2008 | Tsuchiya | .............. G06Q 20/341 726/3 |

(Continued)

FOREIGN PATENT DOCUMENTS

JP        2017-157104 A      9/2017

*Primary Examiner* — Fan Zhang
(74) *Attorney, Agent, or Firm* — Banner & Witcoff, Ltd.

(57) ABSTRACT

A communication device may receive first authentication information from a specific server, store the first authentication information in a memory, store selection information in the memory in a case where one or more service providing servers are selected by a user, send the first authentication information in the memory and first related information to the specific server in a case where the selection information is stored in the memory, determine whether the selection information is stored in the memory in a case where a deletion instruction for instructing deletion of information in the memory is acquired; and delete the first authentication information in the memory in a case where it is determined that the selection information is not stored in the memory. The first authentication information may be not deleted in a case where it is determined that the selection information is stored in the memory.

11 Claims, 14 Drawing Sheets

(56) References Cited

U.S. PATENT DOCUMENTS

| | | | |
|---|---|---|---|
| 2013/0047247 A1* | 2/2013 | Matsuda | G06F 21/335 |
| | | | 726/9 |
| 2014/0071476 A1* | 3/2014 | Aritomi | G06F 3/1288 |
| | | | 358/1.14 |
| 2015/0055176 A1* | 2/2015 | Ochi | G06F 3/1287 |
| | | | 358/1.15 |
| 2015/0154484 A1* | 6/2015 | Iwasaki | G06F 3/1222 |
| | | | 358/1.14 |
| 2016/0028718 A1* | 1/2016 | Hayashi | H04L 63/0807 |
| | | | 726/4 |
| 2017/0199710 A1* | 7/2017 | Ando | G06F 3/1267 |
| 2017/0257441 A1 | 9/2017 | Ohara | |
| 2018/0212956 A1* | 7/2018 | Sanganabhatla | H04L 63/18 |

\* cited by examiner

FIG. 2

First Service Table 40

| Service ID | Target OID | Sending Timing |
|---|---|---|
| default | OID1 (Number of Printed Sheets) | Every 24 Hours |
| service1 | OID2 (Toner Remaining Amount) | Every 12 Hours |
| service2 | OID3 (Number of Printed Sheets Per Sheet Size) | Every 12 Hours |

Management Table 118

| User Name | Password | Device ID | Model Name | Access Token | Service Registration Information | |  |
|---|---|---|---|---|---|---|---|
| | | | | | service 1 | service 2 | ... |
| UN1 | PW1 | XXX1 | MMM1 | AT1 | Registered (AT2) | Registered (AT3) | ... |
| UN2 | PW2 | XXX2 | MMM2 | AT11 | Registered (AT12) | Not Registered | ... |

Second Service Table 120

| Service ID | Target OID | Sending Timing |
|---|---|---|
| default | OID1 (Number of Printed Sheets) | Every 24 Hours |
| service1 | OID2 (Toner Remaining Amount) | Every 12 Hours |
| service2 | OID3 (Number of Printed Sheets Per Sheet Size) | Every 12 Hours |
| ... | | ... |

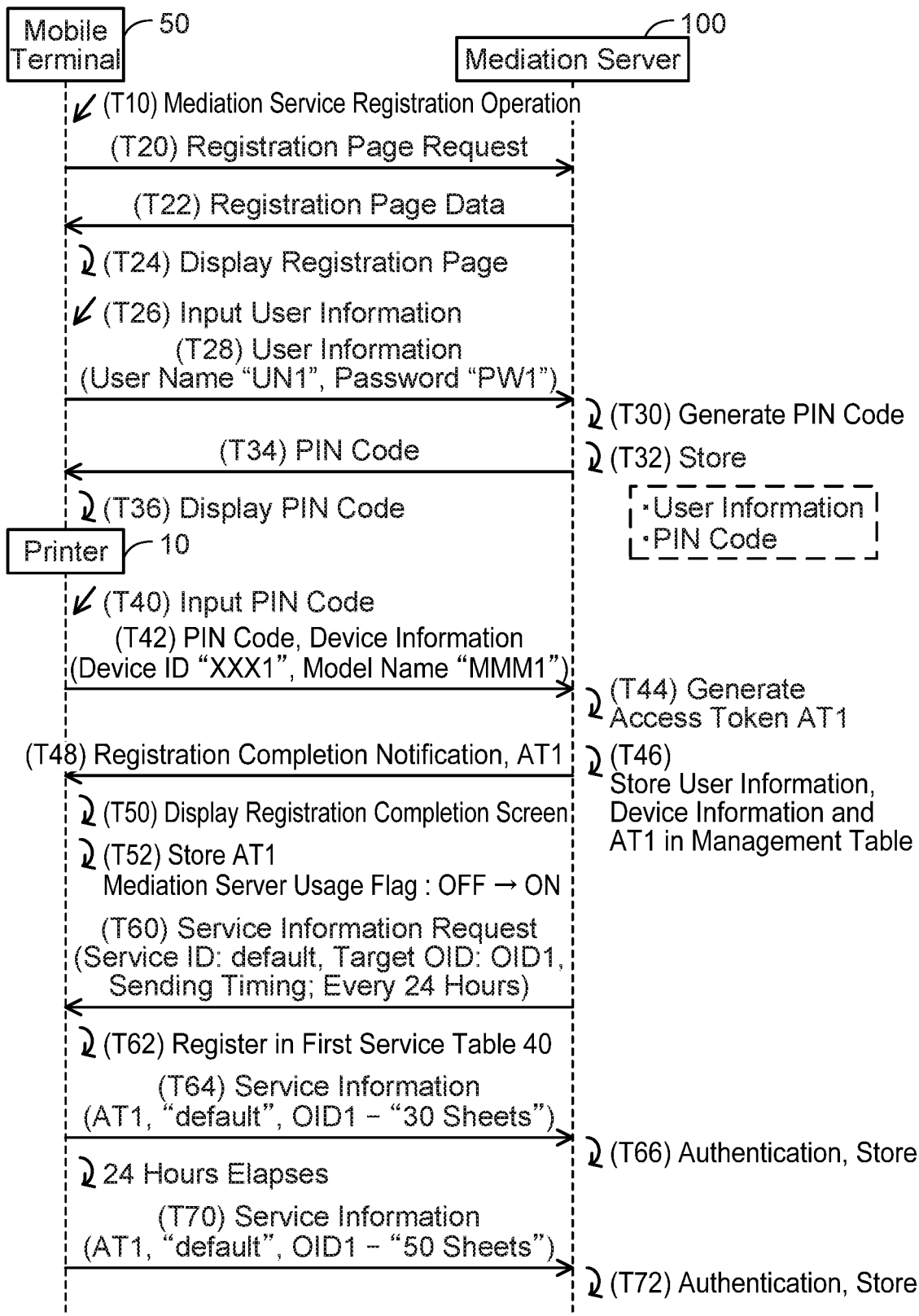

(Continuation of FIG. 4)

FIG. 12

Third Service Table 42

| OID | Sending Timing |
|---|---|
| OID1 (Number of Printed Sheets) | Every 24 Hours |
| OID2 (Toner Remaining Amount) | Every 12 Hours |
| OID3 (Number of Printed Sheets Per Sheet Size) | Every 12 Hours |

Management Table 118

| User Name | Password | Device ID | Model Name | Access Token | Service Registration Information | | ... |
|---|---|---|---|---|---|---|---|
| | | | | | Service 1 | Service 2 | |
| UN1 | PW1 | XXX1 | MMM1 | AT1 | Registered (AT2) | Registered (AT3) | ... |
| UN2 | PW2 | XXX2 | MMM2 | AT11 | Registered (AT12) | Not Registered | ... |

Second Service Table 120

| Service ID | Target OID | Sending Timing |
|---|---|---|
| default | OID1 (Number of Printed Sheets) | Every 24 Hours |
| service1 | OID2 (Toner Remaining Amount) | Every 12 Hours |
| service2 | OID3 (Number of Printed Sheets Per Sheet Size) | Every 12 Hours |
| ... | | ... |

COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD PERFORMED BY COMMUNICATION DEVICE

CROSS-REFERENCE TO RELATED APPLICATION

This application claims priority to Japanese Patent Application No. 2018-027327, filed on Feb. 19, 2018, the entire contents of which are hereby incorporated by reference into the present application.

TECHNICAL FIELD

The disclosure herein discloses a communication device configured to execute communication with a specific server in order to receive provision of a service provided by a service providing server.

BACKGROUND ART

A system including a printer, a terminal device, and a server is known. The server is a server for providing a target service related to the printer to a user of the printer. The server generates an access token when receiving a permanent registration request for using the target service from the terminal device, and sends this access token to the terminal device. The terminal device sends the access token to the printer. The printer uses the access token to establish an XMPP (abbreviation of Extensible Messaging and Presence Protocol) connection with the server. After this, the printer executes communication with the server to receive provision of the target service from the server.

SUMMARY

When an access token is deleted from the printer despite a user not having intended to do so, the user can no longer receive provision of a target service.

The disclosure herein provides a technique that enables a user to suitably receive provision of a service from a service providing server.

A communication device disclosed herein may comprise a processor; and a memory storing computer-readable instructions therein, the computer-readable instructions, when executed by the processor, causing the communication device to: receive, from a specific server, first authentication information generated by the specific server; store the first authentication information in the memory in a case where the first authentication information is received from the specific server; store selection information in the memory in a case where one or more service providing servers are selected by a user, the selection information indicating that the one or more service providing servers have been selected; send the first authentication information in the memory and first related information being related to the communication device to the specific server in a case where the selection information is stored in the memory, wherein in a case where the first authentication information and the first related information are sent to the specific server, the first related information is received by a first service providing server among the one or more service providing servers, and the first service providing server provides a first service to the user by using the first related information; determine whether the selection information is stored in the memory in a case where a deletion instruction for instructing deletion of information in the memory is acquired; and delete the first authentication information in the memory in a case where it is determined that the selection information is not stored in the memory, wherein the first authentication information is not deleted in a case where it is determined that the selection information is stored in the memory.

A control method and a computer program for realizing the communication device above, as well as a computer-readable recording medium storing the computer program are also novel and useful. Further, a communication system that comprises the above communication device, specific server, and first service providing server is also novel and useful.

BRIEF DESCRIPTION OF THE DRAWINGS

FIG. 2 shows an example of tables.
FIG. 3 shows a sequence diagram of a process to register information for a mediation service.
FIG. 12 shows an example of tables in a second embodiment.

EMBODIMENTS (First Embodiment)
(Configuration of Communication System 2; FIGS. 1 and 2)

As shown in FIG. 1, a communication system 2 includes a printer 10, a mobile terminal 50, a mediation server 100, and service providing servers 200, 300. Each of the devices 10 to 300 is configured capable of communicating with others via the Internet 4. Hereinbelow, a service providing server may be termed "SP (Service Providing) server".

(Configuration of Printer 10)

Figure 1:
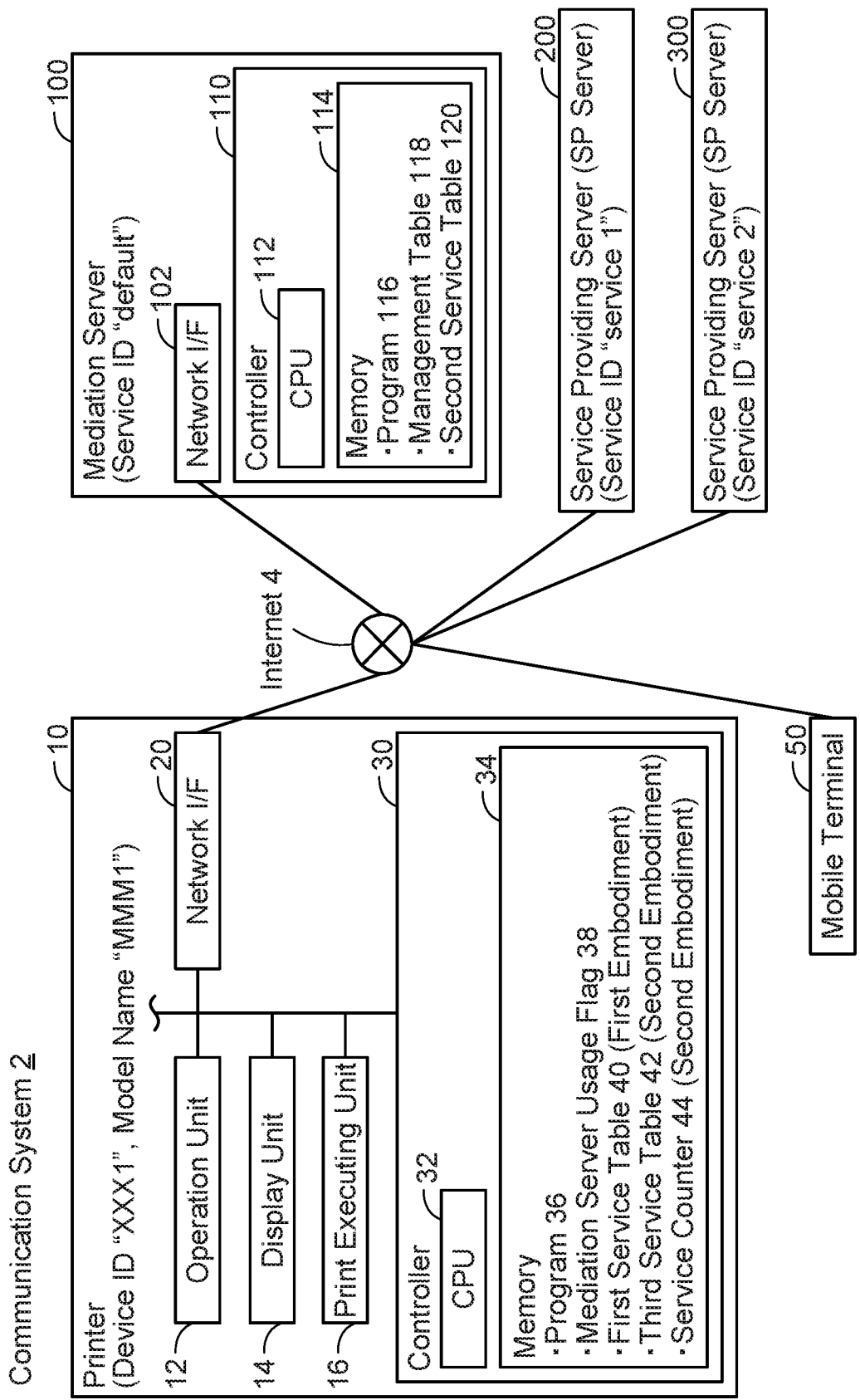
FIG. 1 shows a configuration of a communication system.

The printer 10 is a peripheral device (that is, a peripheral device of a PC or the like) configured to execute a print function. The printer 10 is allocated with a device ID "XXX1" and a model name "MMM1". The printer 10 includes an operation unit 12, a display unit 14, a print executing unit 16, a network interface (hereinbelow, an interface will be denoted "I/F") 20, and a controller 30.

The operation unit 12 includes a plurality of keys. A user can input various instructions to the printer 10 by operating the operation unit 12. The display unit 14 is a display for displaying various types of information. The display unit 14 functions also as a so-called touch panel (that is, an operation unit). The print executing unit 16 is a laser print mechanism that executes printing by using toners. The network I/F 20 is an I/F for connecting to the Internet 4, and it may be a wireless I/F or a wired I/F.

The controller 30 includes a CPU 32 and a memory 34. The CPU 32 is configured to execute various processes according to a program 36 stored in the memory 34. The memory 34 is constituted of a volatile memory, a nonvolatile memory, and the like. The memory 34 stores a mediation server usage flag 38 and a first service table 40 (see FIG. 2). The mediation server usage flag 38 is set to one of values "ON", which indicates that a mediation server usage function for using the mediation server 100 is enabled, and "OFF", which indicates that the mediation server usage function is disabled. The mediation server usage flag 38 is set to OFF at a time of shipping of the printer 10.

(Configuration of Mobile Terminal 50)

The mobile terminal 50 is a portable user terminal such as a note PC, a tablet PC, and a smartphone. However, in a variant, a stationary user terminal may be used instead of the mobile terminal 50.

(Configuration of Mediation Server 100)

The mediation server 100 is a server installed on the Internet 4 by a vendor of the printer 10 for providing a mediation service. The mediation service is a service to provide mediation for service provisions executed by the respective SP servers 200, 300. Further, the mediation server 100 is also a server that collects and manages a number of printed sheets in each of a plurality of printers including the printer 10. The mediation server 100 is allocated with a service ID "default", which is an ID for identifying the mediation service (in other words, an ID for identifying the mediation server 100).

The mediation server 100 includes a network I/F 102 and a controller 110. The network I/F 102 is an I/F for connecting to the Internet 4. The controller 110 includes a CPU 112 and a memory 114. The CPU 112 is configured to execute various processes in accordance with a program 116 stored in the memory 114. The memory 114 stores a management table 118 (see FIG. 2) and a second service table 120 (see FIG. 2).

(Configurations of SP Servers 200, 300)

Each of the SP servers 200, 300 is a server configured to provide a service for the plurality of printers including the printer 10. The SP server 200 is a server that provides a toner cartridge shipping service (hereinbelow termed "first service"). The SP server 200 is allocated with a service ID "service1", which is an ID for identifying the first service (in other words, an ID for identifying the SP server 200). The SP server 300 is a server that provides a print paper shipping service (hereinbelow termed "second service"). The SP server 300 is allocated with a service ID "service2", which is an ID for identifying the second service (in other words, an ID for identifying the SP server 300).

(Contents of Respective Tables 40, 118, 120; FIG. 2)

Next, contents of the table 40 in the printer 10 and the tables 118, 120 in the mediation server 100 will be described with reference to FIG. 2. The first service table 40 of the printer 10 is in an empty state upon the shipping of the printer 10, and it stores information related to a service in response to execution of a process to register information for receiving the service (FIG. 3, etc.). Specifically, the first service table 40 of the printer 10 stores a service ID, a target object ID (OID), and a sending timing in association with each other. The target OID is an OID for identifying information to be sent to a server identified by its corresponding service ID. "OID1", "OID2", and "OID3" are identifiers that respectively identify information indicating "a number of printed sheets", "a remaining amount of toner", and "a number of printed sheets per sheet size". "OID3" is a combination of a plurality of OIDs, and for example, it includes an OID corresponding to the number of printed sheets for A4 size and an OID corresponding to the number of printed sheets for A3 size. The sending timing is information indicating a timing to send a management information base (MIB) value, which is a specific value of information identified by each target OID.

The management table 118 of the mediation server 100 stores, for each of the plurality of printers, information related to a printer in accordance with an instruction from a user of that printer. Specifically, the management table 118 stores a user name, a password, a device ID, a model name, an access token, and service registration information in association with each other. The user name and the password are information for identifying (in other words, authenticating) the user of the printer. The device ID and the model name are the device name and the model name of the printer. The access token is information for executing a communication between the printer and the mediation server 100. The service registration information is information in which the service ID and one of values "Registered" and "Not Registered" are associated with each other for each of the plurality of service IDs for identifying the plural SP servers 200, 300. "Registered" means that the service provision for the printer by the SP server identified by the corresponding service ID is mediated. In this case, an access token for executing a communication between the mediation server 100 and this SP server is further stored as the service registration information. "Not Registered" means that the service provision for the printer by the SP server identified by the corresponding service ID is not mediated.

The second service table 120 of the mediation server 100 is a table generated in advance by the vendor of the printer 10, and stores information related to each of the mediation server 100 and the plurality of SP servers 200, 300. Specifically, the second service table 120 stores a service ID for identifying a server, a target OID, which is an OID for identifying information to be sent to the server, and a sending timing to send the information identified by the target OID to the server in association with each other.

(Case A; FIG. 3)

Next, Case A where the user of the printer 10 registers information for receiving provision of the mediation service provided by the mediation server 100 will be described with reference to FIG. 3. At an initial state of Case A, the first service table 40 of the printer 10 (see FIG. 2) does not have any service ID registered therein, and the management table 118 of the mediation server 100 (see FIG. 2) does not have any information related to the printer 10 registered therein. Further, the mediation server usage flag 38 (see FIG. 1) of the printer 10 is set to OFF. For the sake of easier understanding, when processes which the CPUs 32, 112 of the devices 10, 100 execute in accordance with the programs 36, 116 are to be explained below, the explanation may be given with the device (such as the printer 10) as the subject of action, instead of the CPU as the subject of action.

In T10, the mobile terminal 50 accepts a mediation service registration operation from the user. The mediation service registration operation includes an operation to start a browser, an operation to input a uniform resource locator (URL) of the mediation server 100, and an operation to select a button indicating registration of the mediation service in a top page provided by the mediation server 100. In this case, the mobile terminal 50 sends a registration page request to the mediation server 100 in T20, and receives registration page data from the mediation server 100 in T22.

In T24, the mobile terminal 50 displays a registration page represented by the registration page data. When the mobile terminal 50 accepts an input of user information (that is, a user name "UN1" and a password "PW1") to the registration page in T26, it sends the user information to the mediation server 100 in T28.

When the mediation server 100 receives the user information from the mobile terminal 50 in T28, it generates a PIN code in T30, and temporarily stores the user information and the PIN code in association with each other in the memory 114 in T32. Then, the mediation server 100 sends the PIN code to the mobile terminal 50 in T34.

When the mobile terminal 50 receives the PIN code from the mediation server 100 in T34, it displays the PIN code in T36. Due to this, the user can acknowledge the PIN code to be inputted to the printer 10.

When the printer 10 accepts an input of the PIN code by the user in T40, it sends the PIN code and device information of the printer 10 (that is, the device ID "XXX1" and the model name "MMM1") to the mediation server 100 in T42.

When the mediation server 100 receives the PIN code and the device information from the printer 10 in T42, it determines that the PIN code stored in T32 matches the PIN code received in T42. In this case, the mediation server 100 generates an access token AT1 in T44, and registers the user information stored in T32, the device information received in T42 and the generated access token AT1 in association with each other in the management table 118 (see FIG. 2) in T46. The access token AT1 is information for the mediation server 100 to authenticate the printer 10. At this time point, "Not Registered" is stored as the service registration information for all of service IDs. Then, in T48, the mediation server 100 sends the access token AT1 and a registration completion notification indicating that registration of the information has been completed to the printer 10.

When the printer 10 receives the registration completion notification and the access token AT1 from the mediation server 100 in T48, it causes the display unit 14 to display a registration completion screen including a message indicating that the registration of the information has been completed in T50. Due to this, the user can acknowledge that the registration of the information has been completed. Then, in T52, the printer 10 causes the memory 34 to store the access token AT1 and changes the mediation server usage flag 38 from OFF to ON.

In T60, the mediation server 100 specifies the target OID "OID1" and the sending timing "every 24 hours" associated with the service ID "default" of the mediation server 100 by using the second service table 120 in the memory 114 (see FIG. 2). Then, the mediation server 100 sends a service information request including the service ID "default", the specified target OID "OID1", and the specified sending timing "every 24 hours" to the printer 10.

When the printer 10 receives the service information request from the mediation server 100 in T60, it registers the information included in the service information request (that is, "default", "OID1", and "every 24 hours") in the first service table 40 (see FIG. 2) in T62. Due to this, the printer 10 can send service information in accordance with the information registered in T60 by using the access token AT1 stored in T52. Specifically, the printer 10 sends service information including the MIB value corresponding to the target OID "OID1" for the mediation server 100 identified by the service ID "default" at the sending timing of "every 24 hours". When the printer 10 receives the service information request in T60, it sends the service information to the mediation server 100 in T64 before 24 hours, as indicated by the sending timing, elapses. This service information includes the access token AT1, the service ID "default", and the MIB value "30 sheets" corresponding to "OID1".

When the mediation server 100 receives the service information from the printer 10 in T64, it determines in T66 that the access token AT1 in the service information matches the access token AT1 in the management table 118, that is, it determines that the authentication succeeded, and causes the memory 114 to store the MIB value "30 sheets" corresponding to the OID1 in the service information. As above, the mediation server 100 receives and stores the number of printed sheets from each one of the plurality of printers including the printer 10. Due to this, the vendor of the printer 10 can browse through the numbers of printed sheets for the respective printers stored in the mediation server 100 to grasp usage situations of the respective printers.

Further, after T64 has been executed, the printer 10 monitors that 24 hours, as indicated by the sending timing registered in T62, elapses. When 24 hours elapses, the printer 10 sends service information including the latest MIB value "50 sheets" corresponding to "OID1" to the mediation server 100 in T70. T72 is same as T66 except that the MIB value "50" is stored. After this as well, the printer 10 sends service information including the latest MIB value corresponding to "OID1" to the mediation server 100 every 24 hours.

(Case B; FIGS. 4 to 7)

Next, Case B in which the user of the printer 10 registers information for receiving provisions of services from the respective SP servers 200, 300 will be described with reference to FIGS. 4 to 7. An initial state of Case B is a state after Case A of FIG. 3 has been executed, that is, a state in which only the service ID "default" is registered in the first service table 40 of the printer 10 (see FIG. 2) and the information related to the printer 10 is registered in the management table 118 of the mediation server 100 (see FIG. 2).

Figure 4:
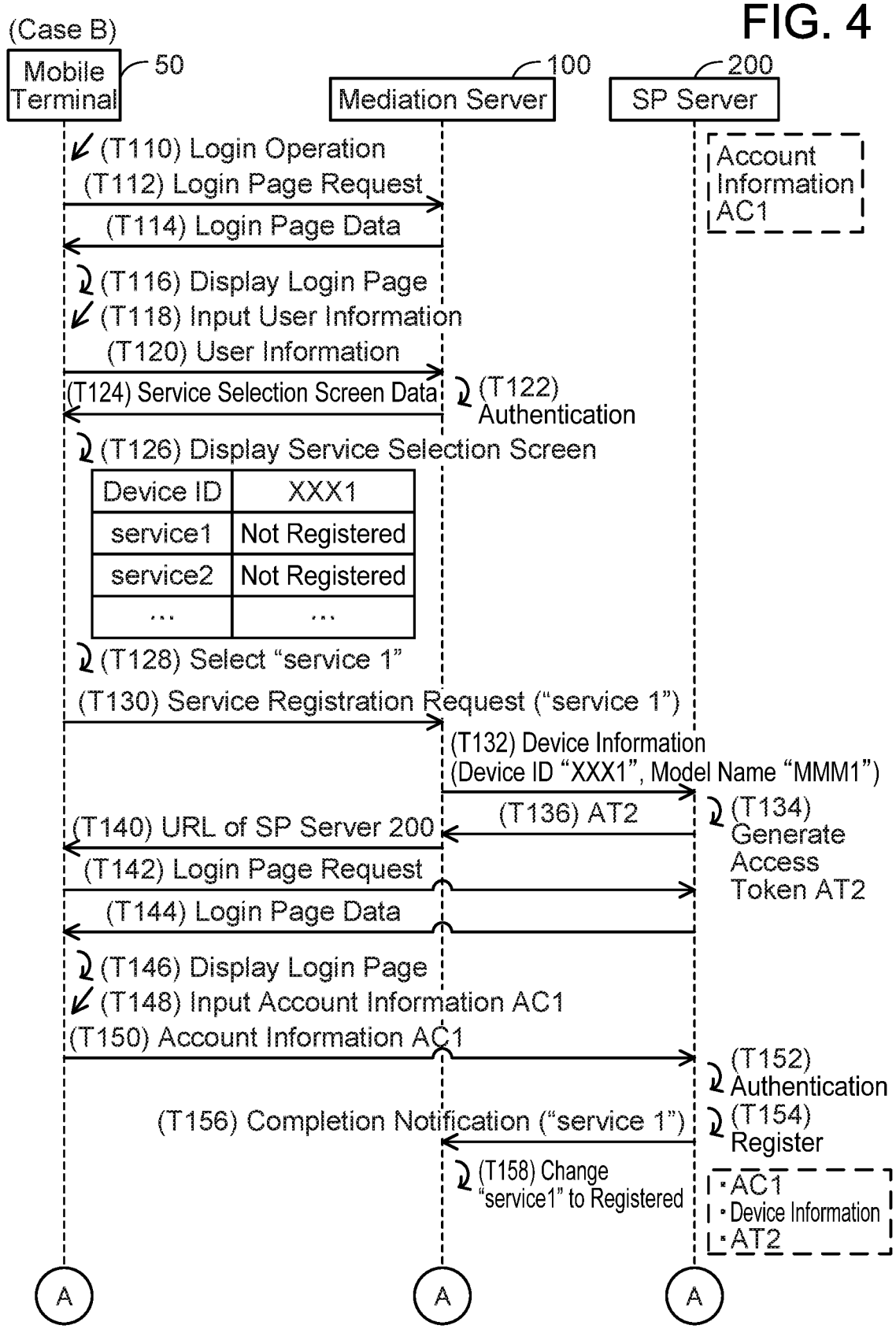
FIG. 4 shows a sequence diagram of a process to register information for a first service.
Figure 5:
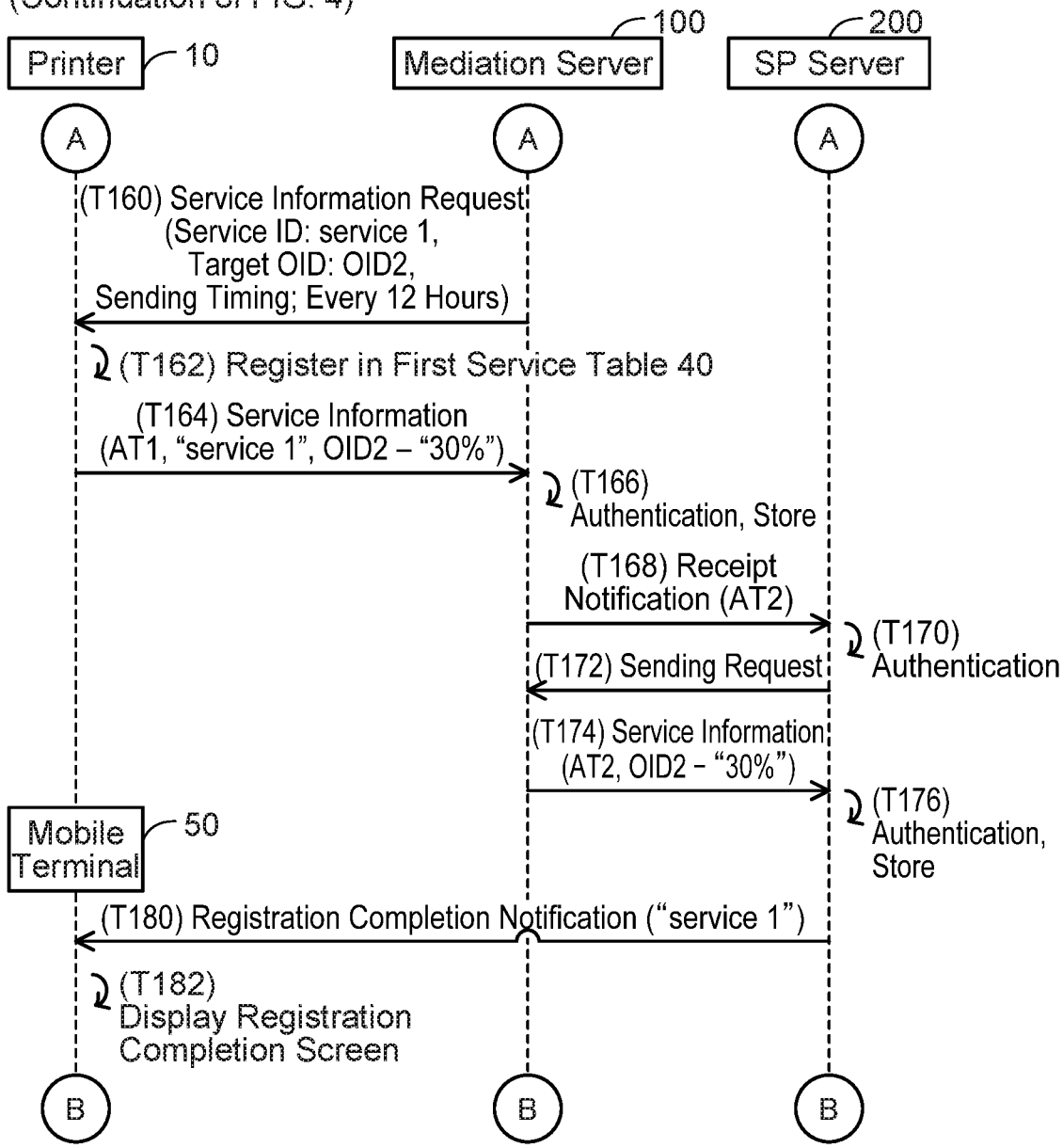
FIG. 5 shows a sequence diagram continuing from FIG. 4.

(Registration for First Service; FIGS. 4 and 5)

FIGS. 4 and 5 show processes to register information for receiving the provision of the first service (that is, the toner cartridge shipping service) from the SP server 200. At the initial state of FIG. 4, the SP server 200 already stores account information AC1 of the user of the printer 10.

In T110, the mobile terminal 50 accepts a login operation by the user. The login operation includes the operation to start the browser, the operation to input the URL of the mediation server 100, and an operation to select a button indicating login in the top page provided by the mediation server 100. In this case, the mobile terminal 50 sends a login page request to the mediation server 100 in T112, receives login page data from the mediation server 100 in T114, and displays a login page represented by the login page data in T116. When the mobile terminal 50 accepts an input of the user information (that is, the user name "UN1" and the password "PW1") to the login page by the user in T118, it sends the user information to the mediation server 100 in T120.

When the mediation server 100 receives the user information from the mobile terminal 50 in T120, it determines that this user information is registered in the management table 118 (that is, it determines that the authentication succeeded) in T122. Then, in T124, the mediation server 100 uses the management table 118 (see FIG. 2) to specify the device ID "XXX1" and the service registration information (for example, "Not Registered" for "service1") associated with the received user information, and generates service selection screen data including the specified information. Then, the mediation server 100 sends the service selection screen data to the mobile terminal 50.

When the mobile terminal 50 receives the service selection screen data from the mediation server 100 in T124, it displays a service selection screen represented by the service selection screen data in T126. The service selection screen includes the device ID "XXX1", the respective service IDs "service1", etc., and a letter string "Not Registered" corresponding to each of the service IDs. When the mobile terminal 50 accepts a selection of the service ID "service1" by the user in the service selection screen in T128, it sends a service registration request including the service ID "service1" to the mediation server 100 in T130.

When the mediation server 100 receives the service registration request from the mobile terminal 50 in T130, it specifies the device information associated with the user information for which the authentication succeeded in T122 (that is, the device ID "XXX1" and the model name "MMM1") by using the management table 118 in T132. Then, the mediation server 100 sends the specified device information to the SP server 200 identified by the service ID "service1" in the service registration request.

When the SP server 200 receives the device information from the mediation server 100 in T132, it generates an access token AT2 in T134, and sends the access token AT2 to the mediation server 100 in T136. The access token AT2 is information for the SP server 200 to authenticate the mediation server 100.

When the mediation server 100 receives the access token AT2 from the SP server 200 in T136, it sends a URL of the SP server 200 to the mobile terminal 50 in T140.

When the mobile terminal 50 receives the URL of the SP server 200 from the mediation server 100 in T140, it sends a login page request to the SP server 200 with the URL as a destination in T142, and receives login page data from the SP server 200 in T144. Then, the mobile terminal 50 displays a login page represented by the login page data in T146. When the mobile terminal 50 accepts an input of the account information AC1 to the login page by the user in T148, it sends the account information AC1 to the SP server 200 in T150.

When the SP server 200 receives the account information AC1 from the mobile terminal 50 in T150, it determines that the account information AC1 is already registered (that is, it determines that the authentication succeeded) in T152. In this case, the SP server 200 stores in T154 the account information AC1, the device information received in T132, and the access token AT2 generated in T134 in association with each other. Then, the SP server 200 sends a completion notification including the service ID "service1" for identifying the SP server 200 to the mediation server 100 in T156.

When the mediation server 100 receives the completion notification from the SP server 200 in T156, it changes target service registration information in the management table 118 (see FIG. 2) in T158. Here, the target service registration information is service registration information associated with the user information of which authentication succeeded in T122. Specifically, the mediation server 100 changes the information corresponding to the service ID "service1", which is included in the completion notification, from "Not Registered" to "Registered" in the target service registration information, and stores the access token AT2.

Next, in T160 of FIG. 5, the mediation server 100 specifies a target OID "OID2" and the sending timing "every 12 hours" associated with the service ID "service1" that is included in the completion notification of T156 of FIG. 4 by using the second service table 120 (see FIG. 2). Then, the mediation server 100 sends a service information request including the service ID "service1", the specified target OID "OID2", and the specified sending timing "every 12 hours" to the printer 10.

When the printer 10 receives the service information request from the mediation server 100 in T160, it registers the information included in the service information request (that is, "service1", "OID2", and "every 12 hours") in the first service table 40 (see FIG. 2) in T162. Due to this, the printer 10 can send service information including a MIB value corresponding to the target OID "OID2" for the SP server 200 identified by the service ID "service1" at the sending timing of "every 12 hours". When the printer 10 receives the service information request in T160, it sends the service information to the mediation server 100 in T164 before 12 hours, as indicated by the sending timing, elapses. This service information includes the access token AT1, the service ID "service1", and the MIB value "30%" corresponding to "OID2".

When the mediation server 100 receives the service information from the printer 10 in T164, it determines in T166 that the access token AT1 in the service information matches the access token AT1 in the management table 118 (see FIG. 2) (that is, it determines that the authentication succeeded), and causes the memory 114 to temporarily store the MIB value corresponding to "OID2" included in the service information. Next, the mediation server 100 specifies the access token AT2 associated with the access token AT1 and the service ID "service1" in the management table 118. Then, the mediation server 100 sends a receipt notification including the specified access token AT2 to the SP server 200 in T168.

When the SP server 200 receives the receipt notification from the mediation server 100 in T168, it determines that the access token AT2 in the receipt notification is registered (see T154 of FIG. 4) in the SP server 200 (that is, it determines that the authentication succeeded) in T170. Then, the SP server 200 sends, to the mediation server 100 in T172, a sending request for requesting service information to be sent.

When the mediation server 100 receives the sending request from the SP server 200 in T172, it sends service information including the access token AT2 and the MIB value "30%" corresponding to "OID2" to the SP server 200 in T174.

When the SP server 200 receives the service information from the mediation server 100 in T174, it determines that the access token AT2 in the service information is registered (see T154 of FIG. 4) in the SP server 200 (that is, it determines that the authentication succeeded) in T176, and stores the MIB value "30%" corresponding to "OID2". Here, in a case where the MIB value corresponding to OID2 is less than or equal to a predetermined value (such as 20%), the SP server 200 executes a process for shipping a toner cartridge to the user of the printer 10. The SP server 200 sends a registration completion notification including the service ID "service1" for identifying the SP server 200 to the mobile terminal 50 in T180.

When the mobile terminal 50 receives the registration completion notification from the SP server 200 in T180, it displays a registration completion screen including a message indicating that the registration of the information for receiving the provision of the first service from the SP server 200 has been completed in T182.

Figure 6:
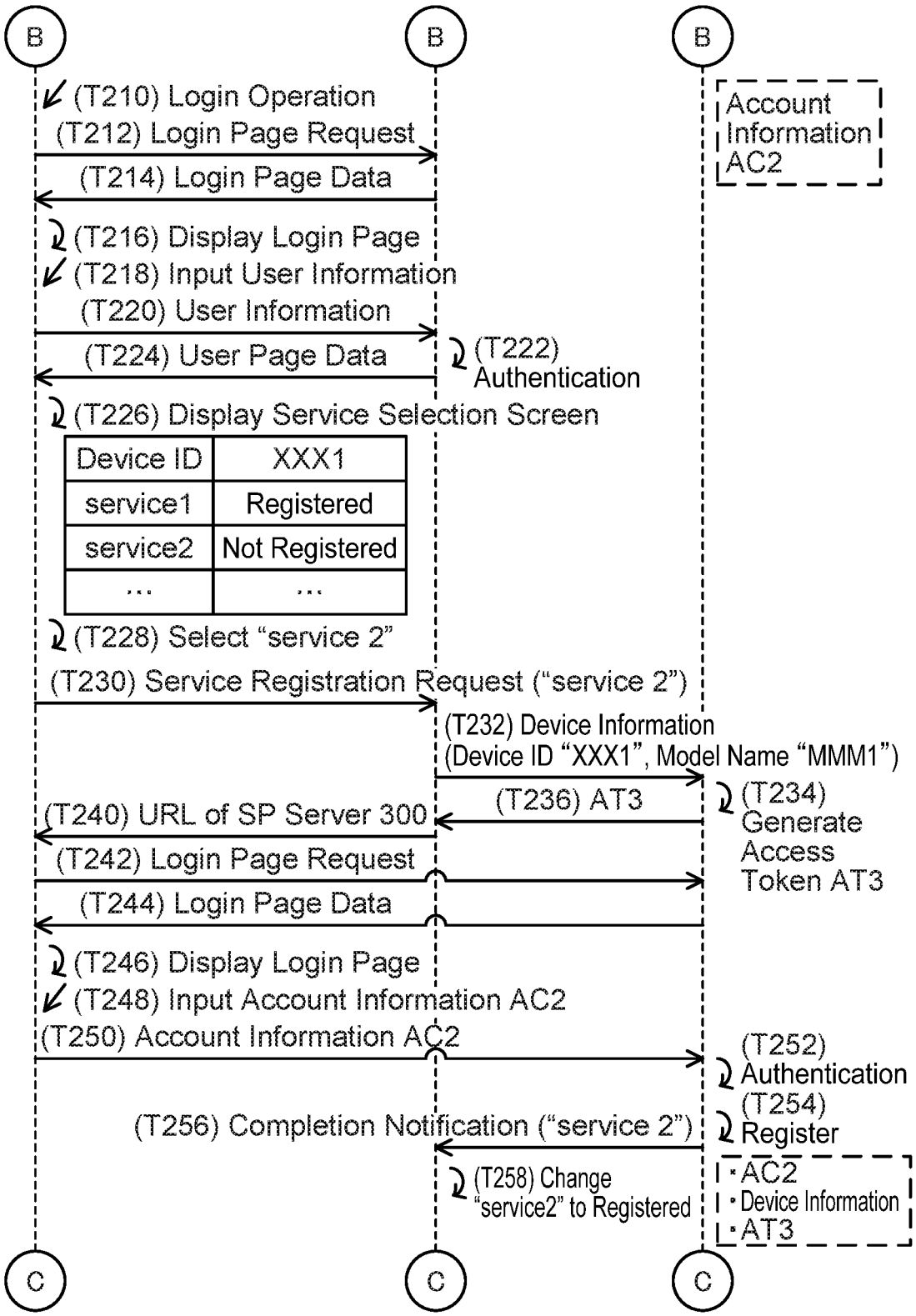
FIG. 6 shows a sequence diagram of a process to register information for a second service.
Figure 7:
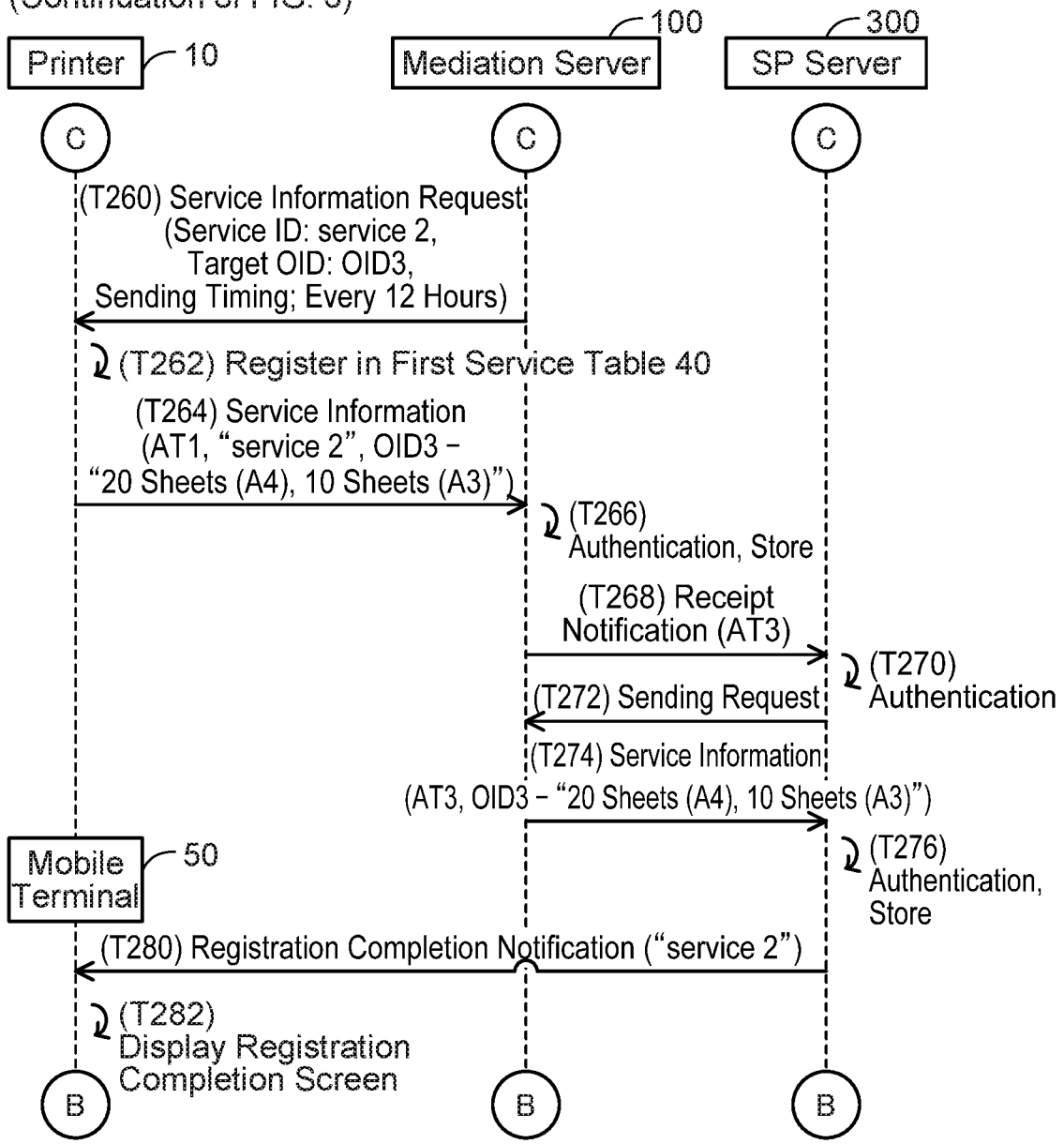
FIG. 7 shows a sequence diagram continuing from FIG. 6.

(Registration for Second Service; FIGS. 6 and 7)

FIGS. 6 and 7 show processes to register information for receiving the provision of the second service (that is, the print paper shipping service) from the SP server 300. The processes of FIGS. 6 and 7 are executed after the processes of FIGS. 4 and 5 have been executed. In an initial state of FIG. 6, account information AC2 of the user is already registered in the SP server 300.

T210 to T226 are same as T110 to T126 of FIG. 4. However, since "Registered" was stored as the information corresponding to "service1" in T158 of FIG. 4, the service ID "service1" and "Registered" are associated with each other in the service selection screen in T226. When the mobile terminal 50 accepts a selection of the service ID "service2" to the service selection screen by the user in T228, it sends a service registration request including the service ID "service2" to the mediation server 100 in T230.

T232 to T236 are same as T132 to T136 of FIG. 4 except that the communication target is the SP server 300. Further, the SP server 300 generates an access token AT3 for the SP server 300 to authenticate the mediation server 100 in T234, and sends the access token AT3 to the mediation server 100 in T236.

When the mediation server 100 receives the access token AT3 from the SP server 300 in T236, it sends a URL of the SP server 300 to the mobile terminal 50 in T240. T242 to T252 are same as T142 to T152 of FIG. 4 except that the communication target is the SP server 300 and that the account information AC2 is used.

In T254, the SP server 300 stores the account information AC2, the device information received in T232, and the access token AT3 generated in T234 in association with each other. Then, the SP server 300 sends a completion notification including the service ID "service2" for identifying the SP server 300 to the mediation server 100 in T256.

When the mediation server 100 receives the completion notification from the SP server 300 in T256, it changes target service registration information in the management table 118 in T258. Here, the target service registration information is service registration information associated with the user information of which authentication succeeded in T222. Specifically, the mediation server 100 changes the information corresponding to the service ID "service2", which is included in the completion notification, from "Not Registered" to "Registered" in the target service registration information, and stores the access token AT3.

Next, in T260 of FIG. 7, the mediation server 100 specifies a target OID "OID3" and the sending timing "every 12 hours" associated with the service ID "service2" that is included in the completion notification of T256 of FIG. 6 by using the second service table 120. Then, the mediation server 100 sends a service information request including the service ID "service2", the specified target OID "OID3", and the specified sending timing "every 12 hours" to the printer 10.

When the printer 10 receives the service information request from the mediation server 100 in T260, it registers the information (that is, "service2", "OID3", and "every 12 hours") included in the service information request in the first service table 40 (see FIG. 2) in T262. Due to this, the printer 10 can send service information including a MIB value corresponding to the target OID "OID3" for the SP server 300 identified by the service ID "service2" at the sending timing of "every 12 hours". When the printer 10 receives the service information request in T260, it sends the service information to the mediation server 100 in T264 before 12 hours, as indicated by the sending timing, elapses. This service information includes the access token AT1, the service ID "service2", and the MIB value "20 sheets (A4) and 10 sheets (A3)" corresponding to the target OID "OID3".

T266 to T276 are same as T166 to T176 of FIG. 5 except that the communication target is the SP server 300. In a case where a number of printed sheets for at least one of the page sizes received in T274 is more than or equal to a predetermined number of sheets (such as 1000 sheets), the SP server 300 executes a process for shipping print paper of that page size to the user of the printer 10. In T280, the SP server 300 sends a registration completion notification including the service ID "service2" for identifying the SP server 300 to the mobile terminal 50.

When the mobile terminal 50 receives the registration completion notification from the SP server 300 in T280, it displays a registration completion screen including a message indicating that the registration of the information for receiving the provision of the second service from the SP server 300 has been completed in T282.

Figure 8:
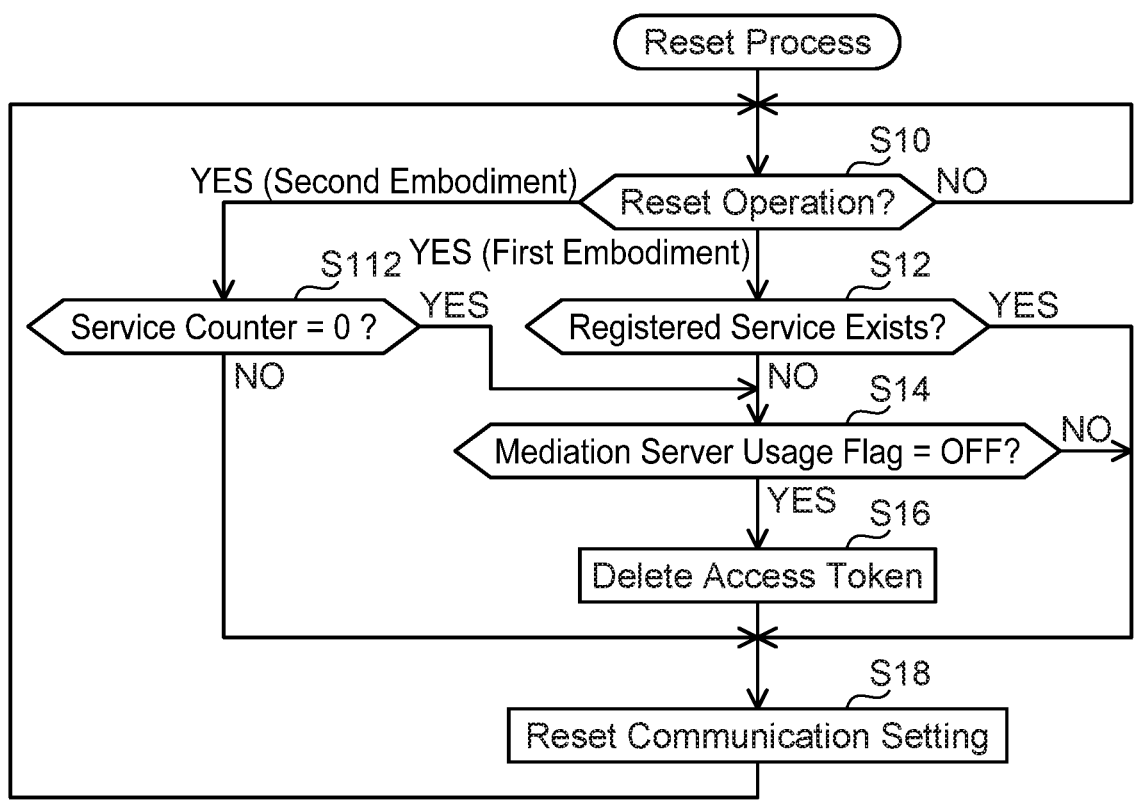
FIG. 8 shows a flowchart of a reset process executed by a printer.

(Reset Process Executed by Printer 10; FIG. 8)

Next, a reset process executed by the CPU 32 of the printer 10 will be described with reference to FIG. 8. The reset process is started when the printer 10 is turned on by the user.

In S10, the CPU 32 monitors accepting an operation instructing to reset information (including communication setting and the like) in the memory 34 (hereinafter referred to as "reset operation"). When accepting the reset operation on the operation unit 12, the CPU 32 acquires a reset instruction, determines YES in S10, and proceeds to S12.

In S12, the CPU 32 determines whether or not a registered service exists. Specifically, in a case where the first service table 40 (see FIG. 2) includes a service ID other than the service ID "default" (such as "service1"), the CPU 32 determines that a registered service exists (YES in S12), and proceeds to S18 by skipping S14 and S16. On the other hand, in a case where the first service table 40 does not include a service ID other than the service ID "default", the CPU 32 determines that no registered service exists (NO in S12), and proceeds to S14.

In S14, the CPU 32 determines whether or not the mediation server usage flag 38 (see FIG. 1) is "OFF". In a case of determining that the mediation server usage flag 38 is "OFF" (YES in S14), the CPU 32 proceeds to S16, whereas in a case of determining that the mediation server usage flag 38 is "ON" (NO in S14), the CPU 32 skips S16 and proceeds to S18.

In S16, the CPU 32 deletes the access token AT1 for communicating with the mediation server 100. By doing so, the printer 10 becomes unable to communicate with the mediation server 100.

In S18, the CPU 32 resets the communication setting of the printer 10. By doing so, the printer 10 becomes unable to access the Internet 4. The CPU 32 returns to S10 when S18 is completed. The CPU 32 proceeds to S18 without executing S16 in the case of determining YES in S12 or in the case of determining NO in S14. That is, the CPU 32 resets the communication setting without deleting the access token AT1.

Figure 9:
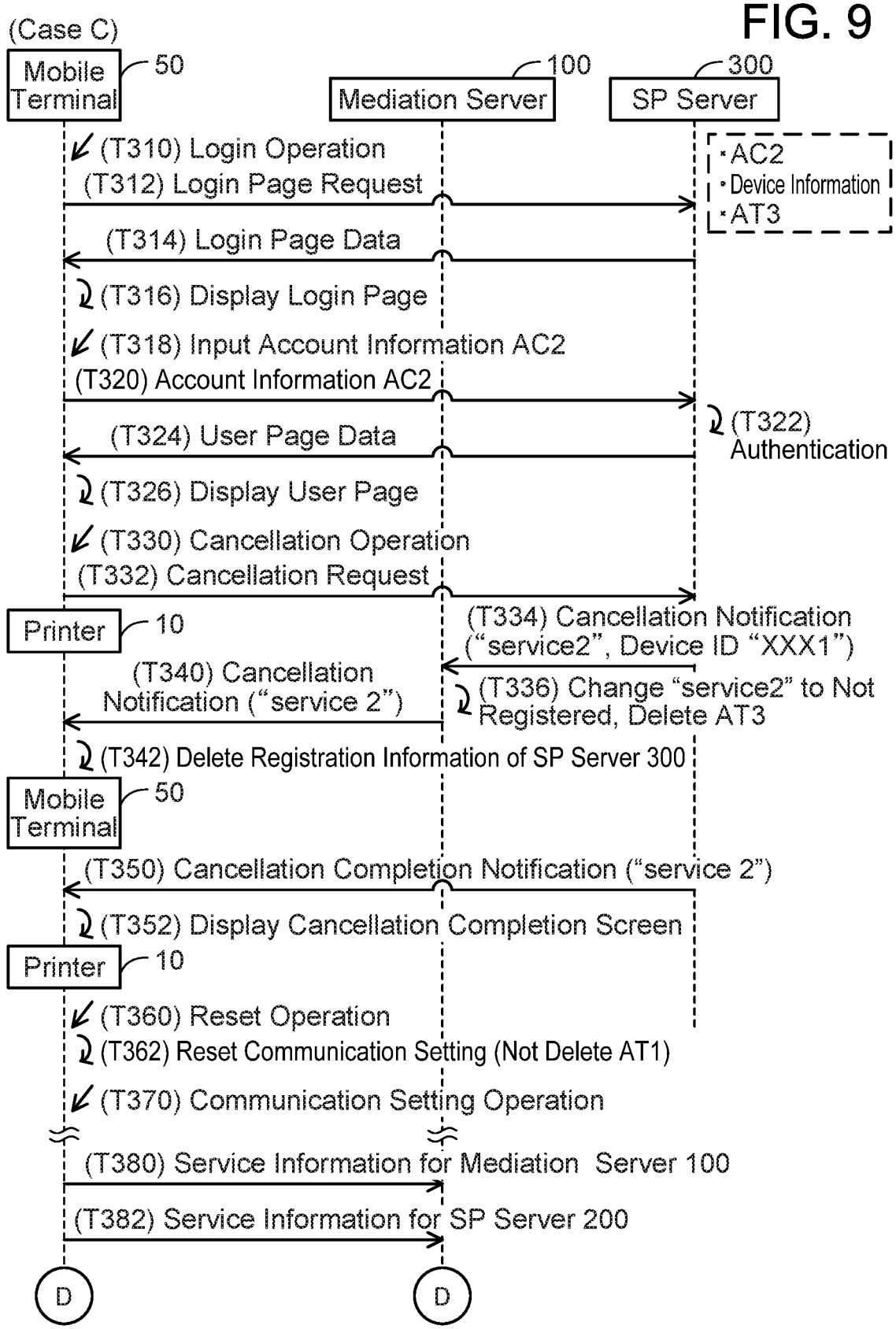
FIG. 9 shows a sequence diagram of a process to cancel the second service.
Figure 10:
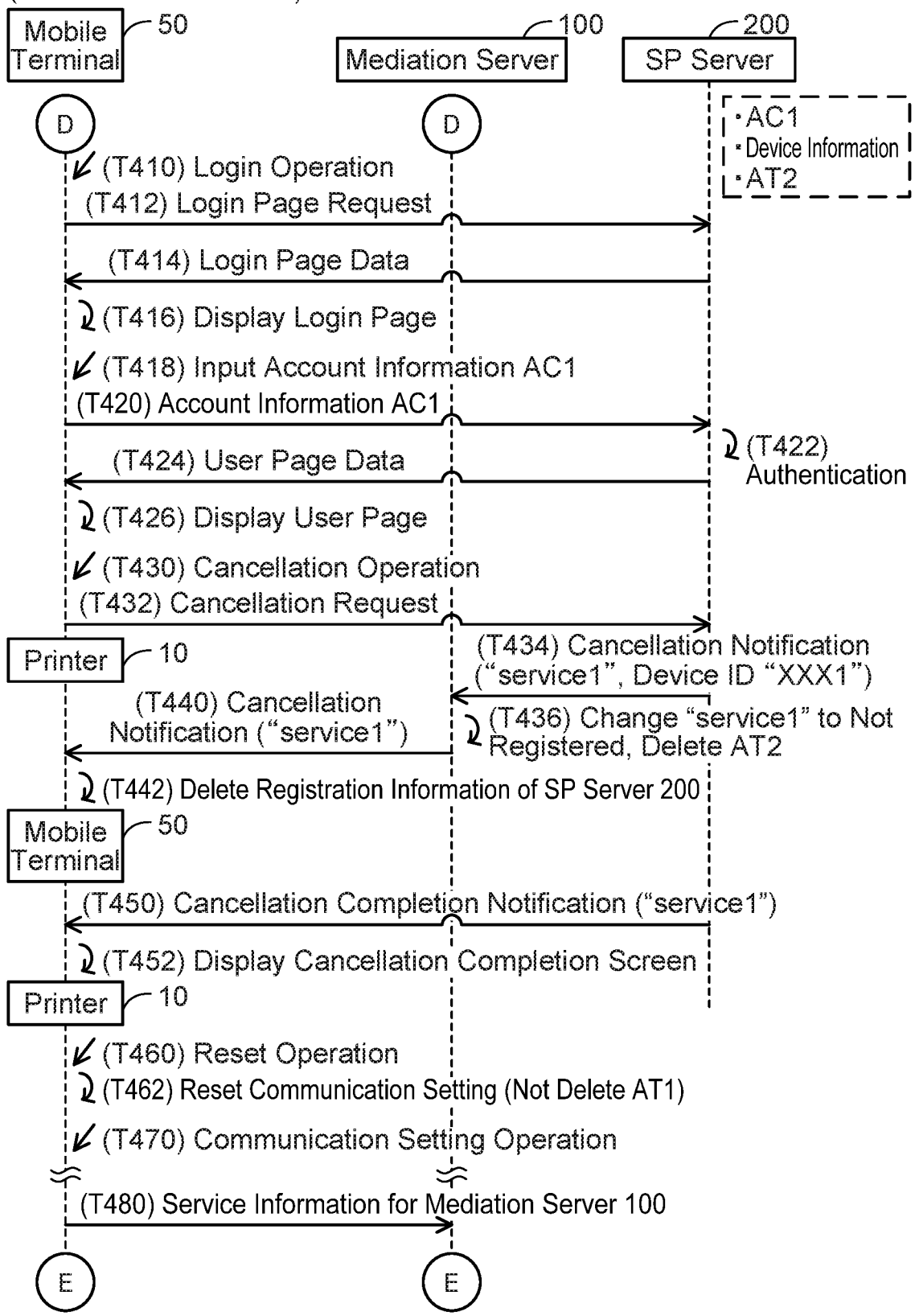
FIG. 10 shows a sequence diagram of a process to cancel the first service.
Figure 11:
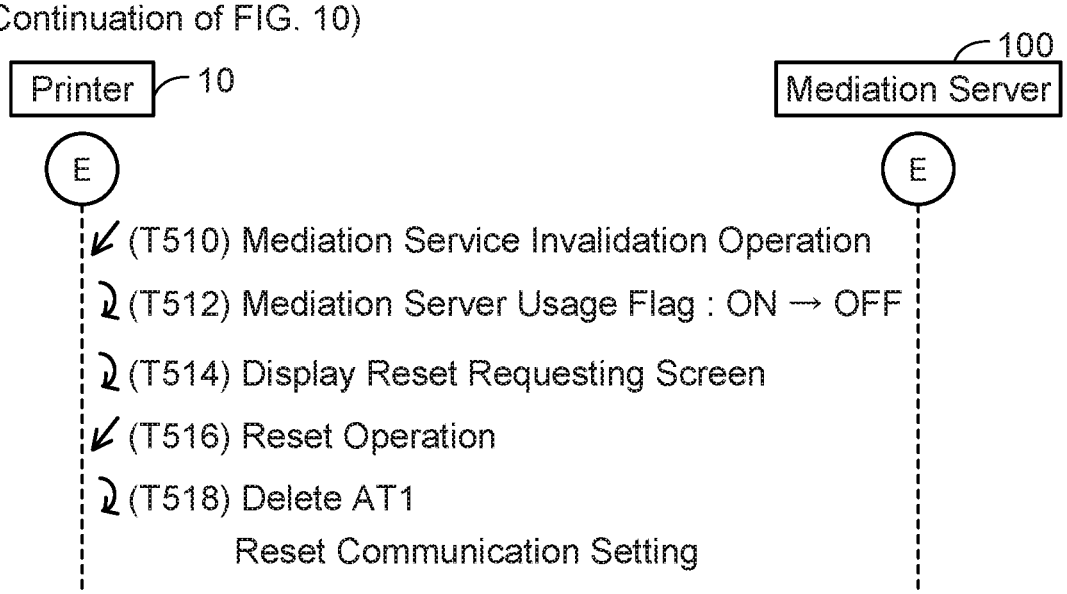
FIG. 11 shows a sequence diagram of a process to invalidate the mediation service.

(Case C; FIGS. 9 to 11)

Next, Case C in which the user of the printer 10 cancels the first and second services and invalidate the mediation service will be described with reference to FIGS. 9 to 11. Case C is a state after FIG. 7, that is, a state in which the first service table 40 of the printer 10 (see FIG. 2) stores the information for receiving the provisions of the first and second services. Further, in the management table 118 of the mediation server 100 (see FIG. 2), "Registered" is stored for the information corresponding to both the service IDs "service1" and "service2" in the service registration information corresponding to the device ID "XXX1".

(Cancellation of Second Service; FIG. 9)

FIG. 9 shows a process to cancel the second service provided by the SP server 300. The SP server 300 already registers the account information AC2, the device information of the printer 10, and the access token AT3 (see T254 of FIG. 6).

In T310, the mobile terminal 50 receives a login operation by the user. The login operation includes the operation to start the browser, the operation to input the URL of the SP server 300, and an operation to select a button indicating login in a top page provided by the SP server 300. In this case, the mobile terminal 50 sends a login page request to the SP server 300 in T312. T314 to T322 are same as T244 to T252 of FIG. 6.

When the SP server 300 determines that the authentication of the account information AC2 succeeded, it sends user page data corresponding to the account information AC2 to the mobile terminal 50 in T324.

When the mobile terminal 50 receives the user page data from the SP server 300 in T324, it displays a user page represented by the user page data in T326. The user page displays various types of information related to the user owning the account information AC2 (such as an address). Although not shown, these types of information are stored in association with the account information AC2 in a course of the processes of FIGS. 6 and 7. When the mobile terminal 50 accepts a cancellation operation to cancel the second service on the user page by the user in T330, it sends a cancellation request to the SP server 300 in T332.

When the SP server 300 receives the cancellation request from the mobile terminal 50 in T332, it sends a cancellation notification including the service ID "service2" for identifying the SP server 300 and the device ID "XXX1" corresponding to the account information AC2 to the mediation server 100 in T334.

When the mediation server 100 receives the cancellation notification from the SP server 300 in T334, it changes the service registration information corresponding to the device ID "XXX1" and the service ID "service2" in the management table 118 (see FIG. 2) from "Registered" to "Not Registered" and deletes the access token AT3 in T336. Then, the mediation server 100 sends a cancellation notification including the service ID "service2" to the printer 10 in T340.

When the printer 10 receives the cancellation notification from the mediation server 100 in T340, it deletes the service ID "service2" and the information associated with this service ID (that is, the target OID "OID3" and the sending timing "every 12 hours") from the first service table 40 (see FIG. 2) in T342. As a result, the printer 10 no longer sends the service information for the SP server 300 (for example, see T264 of FIG. 7) to the mediation server 100. The printer 10 does not delete the access token AT1 for executing a communication with the mediation server 100 even when receiving the cancellation notification from the mediation server 100 in T340. Therefore, the printer 10 maintains to be able to communicate with the mediation server 100 by using the access token AT1.

When the mobile terminal 50 receives a cancellation completion notification including the service ID "service2" for identifying the SP server 300 in T350, it displays a cancellation completion screen including a message indicating that the cancellation of the second service has been completed in T352. Due to this, the user can acknowledge that the cancellation of the second service has been completed.

A situation will be assumed in which the printer 10 becomes unable to access the Internet 4 after the above due to some sort of error. In this case, to reset the communication setting of the printer 10, the user operates the operation unit 12 of the printer 10 to perform the reset operation in T360. When the printer 10 accepts the reset operation by the user in T360 (YES in S10 of FIG. 8), it determines that the first service table 40 includes the service ID "service1" (YES in S12), and resets the communication setting in T362 without deleting the access token AT1 (S18). Then, when the user performs a communication setting operation to set the communication setting of the printer 10 again in T370, the printer 10 becomes able to access the Internet 4. Due to this, the printer 10 can send the service information for the mediation server 100 (such as T64 of FIG. 3) to the mediation server 100 in T380, and can send the service information for the SP server 200 (see T174 of FIG. 5, for example) to the mediation server 100 in T382.

(Cancellation of First Service; FIG. 10)

FIG. 10 is a continuation of FIG. 9, and shows a process to cancel the first service provided by the SP server 200. The SP server 200 already stores the account information AC1, the device information of the printer 10, and the access token AT2 (see T154 of FIG. 4).

T410 to T432 are same as T310 to T332 of FIG. 9 except that the communication target is the SP server 200.

When the SP server 200 receives the cancellation request from the mobile terminal 50 in T432, it sends a cancellation notification including the service ID "service1" for identifying the SP server 200 and the device ID "XXX1" corresponding to the account information AC1 to the mediation server 100 in T434.

When the mediation server 100 receives the cancellation notification from the SP server 200 in T434, it changes the service registration information corresponding to the device ID "XXX1" and the service ID "service1" in the management table 118 (see FIG. 2) from "Registered" to "Not Registered" and deletes the access token AT2 in T436. Then, the mediation server 100 sends a cancellation notification including the service ID "service1" to the printer 10 in T440.

When the printer 10 receives the cancellation notification from the mediation server 100 in T440, it deletes the service ID "service1" and the information associated with this service ID (that is, the target OID "OID2" and the sending timing "every 12 hours") from the first service table 40 (see FIG. 2) in T442. As a result, the printer 10 no longer sends the service information for the SP server 200 (for example, see T174 of FIG. 5) to the mediation server 100. The printer 10 does not delete the access token AT1 even when receiving the cancellation notification from the mediation server 100 in T440. Therefore, the printer 10 maintains to be able to communicate with the mediation server 100 by using the access token AT1.

T450 and T452 are same as T350 and T352 of FIG. 9 except that the communication target is the SP server 200. Further, the reset operation is executed in T460 same as in T360 of FIG. 9. In this case, the printer 10 determines that the first service table 40 does not include any service IDs other than the service ID "default" (NO in S12), determines that the mediation server usage flag 38 is "ON" (NO in S14), and resets the communication setting in T462 without deleting the access token AT1 (S18). T470 and T480 are same as T370 and T380 of FIG. 9, respectively.

(Invalidation of Mediation Server Usage Function; FIG. 11)

FIG. 11 is a continuation of FIG. 10, and shows a process to invalidate the mediation service of the printer 10. When the printer 10 accepts a mediation service invalidation operation by the user in T510, it changes the mediation server usage flag 38 from "ON" to "OFF" in T512. By doing so, the mediation server usage function of the printer 10 is invalidated. As a result, the printer 10 no longer sends the service information for the mediation server 100 (for example, see T64 of FIG. 3) to the mediation server 100.

The printer 10 displays a reset requesting screen that requests to reset information in the memory 34 of the printer 10 on the display unit 14 in T514. Further, when the printer 10 accepts the reset operation by the user in T516 (YES in S10 of FIG. 8), it determines that the first service table 40 includes only the service ID "default" (NO in S12), determines that the mediation server usage flag 38 is "OFF" (YES in S14), deletes the access token AT1 (S16), and resets the communication setting (S18) in T518.

(Effects of the Present Embodiment)

Prior to explaining the effects of the present embodiment, an operation of a printer of a comparative example will be described. When accepting the reset operation by the user (YES in S10 of FIG. 8), the printer of the comparative example executes the same processes as the printer 10 except that it proceeds to S16 without executing the processes of S12 and S14 of FIG. 8. That is, when the printer of the comparative example accepts the reset operation by the user in T360 of FIG. 9, it deletes the access token AT1 and resets the communication setting despite the first service table 40 including the service ID "service1". In this case, the printer can no longer execute communication with the mediation server 100 by using the access token AT1. Due to this, the printer cannot send the service information for the SP server 200 to the mediation server 100, as a result of which the user cannot receive the provision of the first service from the SP server 200.

On the other hand, when accepting the reset operation by the user (YES in S10 of FIG. 8, T360 of FIG. 9), the printer 10 of the present embodiment resets the communication setting (S18, T362) without deleting the access token AT1 in the case where the first service table 40 includes the service ID "service1" (YES in S12, T362). In this case, when the communication setting of the printer 10 is set again by the user thereafter, the printer 10 can execute communication with the mediation server 100 by using the access token AT1. That is, the printer 10 can send the service information for the SP server 200 to the mediation server 100. As a result, the user can suitably receive the provision of the first service from the SP server 200.

(Corresponding Relationships)

The printer 10 and the memory 34 of the printer 10 are respectively examples of "communication device" and "memory". The SP server 200 and the SP server 300 are respectively examples of "first service providing server" and "second service providing server". The mobile terminal 50 is an example of "terminal device". The service information for the SP server 200 and the service information for the SP server 300 are respectively examples of "first related information" and "second related information". The access token AT1 and the access token AT2 are respectively examples of "first authentication information" and "second authentication information". The service ID "service1" of the SP server 200 registered in the first service table 40 is an example of "selection information". The mediation server usage flag 38 is an example of "function information". The reset instruction is an example of "deletion instruction". The OID is an example of "information identifier". The service ID is an example of "server identifier". The cancellation notification in T440 of FIG. 10 is an example of "predetermined notification".

T48 of FIG. 3 and T52 of FIG. 3 are respectively examples of "receive, from a specific server, first authentication information generated by the specific server" and "store the first authentication information in the memory in a case where the first authentication information is received from the specific server". T162 of FIG. 5 and T164 of FIG. 5 are respectively examples of "store selection information in the memory in a case where one or more service providing servers are selected by a user" and "send the first authentication information in the memory and first related information being related to the communication device to the specific server in a case where the selection information is stored in the memory". S12 of FIG. 8 is an example of "determine whether the selection information is stored in the memory in a case where a deletion instruction for instructing deletion of information in the memory is acquired". S16 of FIG. 8 and T518 of FIG. 11 are examples of "delete the first authentication information in the memory in a case where it is determined that the selection information is not stored in the memory".

(Second Embodiment)

In the present embodiment, a third service table 42 (see FIG. 12) and a service counter 44 are stored in the memory 34 of the printer 10, instead of the first service table 40 of the first embodiment. The service counter 44 is information indicating a number of services which the user of the printer 10 is using among the services provided respectively by the plurality of SP servers including the SP servers 200, 300. Further, in the present embodiment, a reset process (FIG. 8) executed by the CPU 32 of the printer 10 is different from the reset process of the first embodiment. Processes that are common between the embodiments will be given the same reference signs and descriptions thereof will be omitted.

(Contents of Tables 42, 118, 120; FIG. 12)

Contents of the third service table 42 in the printer 10 and the respective tables 118, 120 in the mediation server 100 will be described with reference to FIG. 12. The third service table 42 in the printer 10 is same as the first service table 40 of the first embodiment except that it does not include the service ID. The respective tables 118, 120 in the mediation server 100 are same as the respective tables 118, 120 of the first embodiment.

Figure 13:
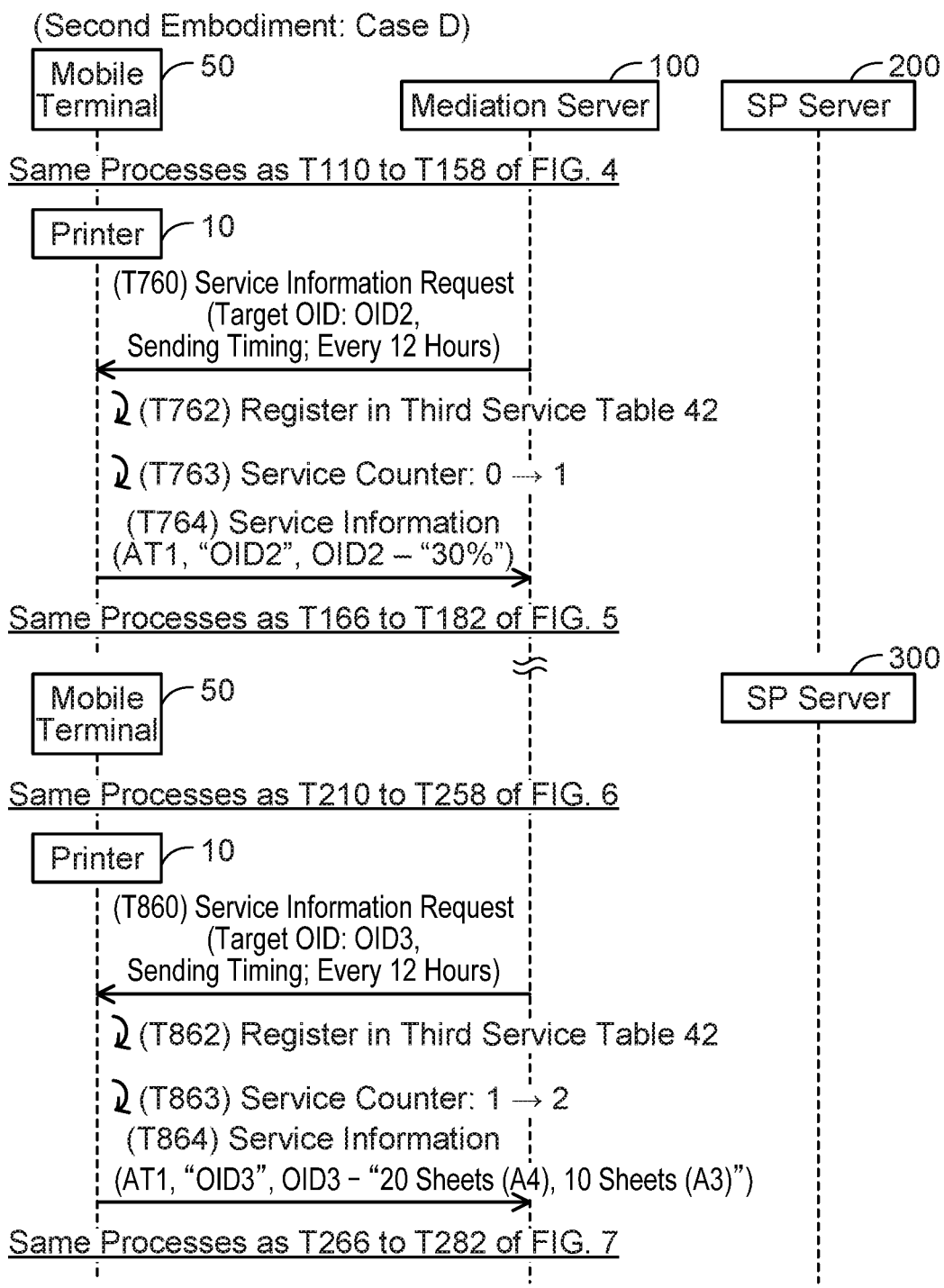
FIG. 13 shows a sequence diagram of a process to register information for services in the second embodiment.

(Case D; FIG. 13)

Case D in which the user of the printer 10 registers the information for receiving the provisions of the services from the respective SP servers 200, 300 will be described with reference to FIG. 13. Case D is a state after Case A of FIG. 3. However, in this embodiment, the service information request in T60 and the service information in T64, T70 of FIG. 3 do not include the service ID "default". Due to this, the printer 10 registers the target OID "OID1" and the sending timing "every 24 hours" included in the service information request in the third service table 42 (see FIG. 12) in T62. Further, the printer 10 does not change the service counter 44 even when receiving the service information request including the target OID "OID1" and the sending timing "every 24 hours". Therefore, in an initial state of FIG. 13, the third service table 42 only registers the target OID "OID1" and the sending timing "every 24 hours", the service counter 44 is "0", and the management table 118 of the mediation server 100 (see FIG. 12) registers the information related to the printer 10.

When the mobile terminal 50 accepts the login operation to the SP server 200 by the user, processes same as T110 to T158 of FIG. 4 are executed between the mobile terminal 50, the mediation server 100, and the SP server 200. Then, in T760, the mediation server 100 specifies the target OID "OID2" and the sending timing "every 12 hours" associated with the service ID "service1" included in the completion notification in T156 of FIG. 4 by using the second service table 120. Then, the mediation server 100 sends a service information request including the specified target OID "OID2" and the specified sending timing "every 12 hours" to the printer 10.

When the printer 10 receives the service information request from the mediation server 100 in T760, it registers the information (that is, "OID2" and "every 12 hours") included in the service information request in the third service table 42 in T762, and changes the service counter 44 from "0" to "1" in T763. Due to this, the printer 10 can send service information including an MIB value corresponding to the target OID "OID2" at the sending timing of "every 12 hours". When the printer 10 receives the service information request in T760, it sends the service information to the mediation server 100 in T764 before 12 hours, as indicated by the sending timing, elapses. This service information includes the access token AT1, the target OID "OID2", and the MIB value "30%" corresponding to the target OID "OID2".

When the mediation server 100 receives the service information from the printer 10 in T764, it specifies the service ID "service1" associated with the target OID "OID2" included in the service information by using the second service table 120 in the memory 114. After this, processes same as T166 to T182 of FIG. 5 are executed between the printer 10, the mobile terminal 50, the mediation server 100, and the SP server 200. Due to this, the registration of the information for receiving the provision of the first service is completed.

Next, when the mobile terminal 50 accepts the login operation to the SP server 300 by the user, processes same as T210 to T258 of FIG. 6 are executed between the mobile terminal 50, the mediation server 100, and the SP server 300. Then, in T860, the mediation server 100 specifies the target OID "OID3" and the sending timing "every 12 hours" associated with the service ID "service2" included in the completion notification in T256 of FIG. 6 by using the second service table 120. Then, the mediation server 100 sends a service information request including the specified target OID "OID3" and the specified sending timing "every 12 hours" to the printer 10.

When the printer 10 receives the service information request from the mediation server 100 in T860, it registers the information (that is, "OID3" and "every 12 hours") included in the service information request in the third service table 42 in T862, and changes the service counter 44 from "1" to "2" in T863. Due to this, the printer 10 can send service information including an MIB value corresponding to the target OID "OID3" at the sending timing of "every 12 hours". When the printer 10 receives the service information request in T860, it sends the service information to the mediation server 100 in T864 before 12 hours, as indicated by the sending timing, elapses. This service information includes the access token AT1, the target OID "OID3", and the MIB value "20 sheets (A4), 10 sheets (A3)" corresponding to the target OID "OID3".

When the mediation server 100 receives the service information from the printer 10 in T864, it specifies the service ID "service2" associated with the target OID "OID3" in the service information by using the second service table 120 in the memory 114. After this, processes same as T266 to T282 of FIG. 7 are executed between the printer 10, the mobile terminal 50, the mediation server 100, and the SP server 300. Due to this, the registration of the information for receiving the provision of the second service is completed.

(Reset Process; FIG. 8)

Next, a reset process of the present embodiment will be described with reference to FIG. 8. In the case of determining YES in S10, the CPU 32 of the printer 10 executes same processes as the CPU 32 of the first embodiment except that it proceeds to S112.

In S112, the CPU 32 determines whether or not the service counter 44 is "0". The CPU 32 proceeds to S14 in a case of determining that the service counter 44 is "0" (YES in S112), and the CPU 32 proceeds to S18 in a case of determining that the service counter 44 is not "0" (NO in S112).

Figure 14:
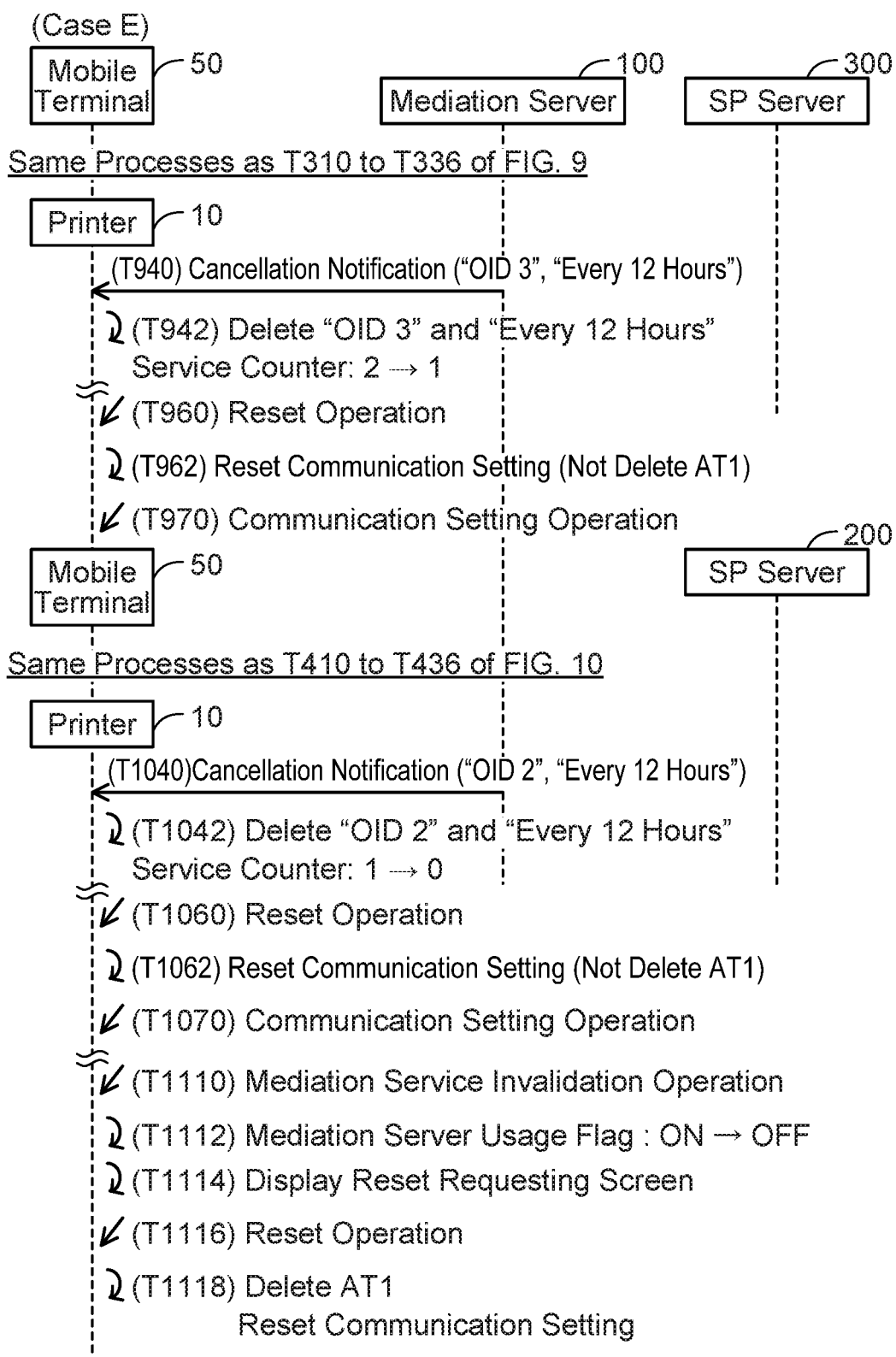
FIG. 14 shows a sequence diagram of a process to cancel the respective services and invalidate the mediation service in the second embodiment.

(Case E; FIG. 14)

Next, Case E in which the user of the printer 10 cancels the first and second services and invalidates the mediation service will be described with reference to FIG. 14. Case E is a state after FIG. 13, that is, a state where the third service table 42 of the printer 10 (see FIG. 12) stores the information for receiving the provisions of the first and second services. Further, the management table 118 of the mediation server 100 (see FIG. 12) stores "Registered" for the information corresponding to the service IDs "service1" and "service2" in the service registration information corresponding to the device ID "XXX1", and the service counter 44 is "2".

When the mobile terminal 50 accepts the login operation to the SP server 300 by the user, processes same as T310 to T336 of FIG. 9 are executed between the mobile terminal 50, the mediation server 100, and the SP server 300. The mediation server 100 sends a cancellation notification including the target OID "OID3" and the sending timing "every 12 hours" to the printer 10 in T940.

When the printer 10 receives the cancellation notification from the mediation server 100 in T940, it deletes the target OID "OID3" and the sending timing "every 12 hours" from the third service table 42 (see FIG. 12) and changes the service counter 44 from "2" to "1" in T942. As a result, the printer 10 no longer sends the service information for the SP server 300 including the access token AT1, the target OID "OID3", and the MIB value corresponding to the target OID "OID3" (for example, see T864 of FIG. 13) to the mediation server 100. After this, although omitted from the drawing, processes same as T350, T352 of FIG. 9 are executed between the mobile terminal 50 and the SP server 300.

The reset operation being executed in T960 is same as T360 of FIG. 9. In this case, the printer 10 determines that the service counter 44 is "1" (NO in S112), and resets the communication setting without deleting the access token AT1 (S18) in T962. T970 is same as T370. After this, although omitted from the drawing, processes same as T380, T382 of FIG. 9 are executed between the printer 10 and the mediation server 100.

Next, when the mobile terminal 50 accepts the login operation to the SP server 200 by the user, processes same as T410 to T436 of FIG. 10 are executed between the mobile terminal 50, the mediation server 100, and the SP server 200. The mediation server 100 sends a cancellation notification including the target OID "OID2" and the sending timing "every 12 hours" to the printer 10 in T1040.

When the printer 10 receives the cancellation notification from the mediation server 100 in T1040, it deletes the target OID "OID2" and the sending timing "every 12 hours" from the third service table 42 (see FIG. 12) and changes the service counter 44 from "1" to "0" in T1042. As a result, the printer 10 no longer sends the service information for the SP server 200 including the access token AT1, the target OID "OID2", and the MIB value corresponding to the target OID "OID2" (for example, see T764 of FIG. 13) to the mediation server 100. After this, although omitted from the drawing, processes same as T450, T452 of FIG. 10 are executed between the mobile terminal 50 and the SP server 200.

The reset operation being executed in T1060 is same as T360 of FIG. 9. In this case, the printer 10 determines that the service counter 44 is "0" (YES in S112), determines that the mediation server usage flag 38 is ON (NO in S114), and resets the communication setting without deleting the access token AT1 (S18) in T1062. T1070 is same as T470 of FIG. 10. After this, although omitted from the drawing, a process same as T480 is executed between the printer 10 and the mediation server 100.

T1110 to T1116 are same as T510 to T516 of FIG. 11. In this case, the printer 10 determines that the service counter 44 is "0" (YES in S112), determines that the mediation server usage flag 38 is "OFF" (YES in S14), and deletes the access token AT1 (S16) and resets the communication (S18) in T1118.

(Effects of the Present Embodiment)

Prior to explaining the effects of the present embodiment, an operation of a printer of a comparative example will be described. When accepting the reset operation by the user (YES in S10 of FIG. 8), the printer of the comparative example executes processes same as the printer 10 except that it proceeds to S16 without executing the processes of S112 and S14 of FIG. 8. That is, when the printer of the comparative example accepts the reset operation by the user in T960 of FIG. 14, it deletes the access token AT1 and resets the communication setting despite the service counter 44 being "1". In this case, the printer can no longer execute communication with the mediation server 100 by using the access token AT1. Due to this, the printer cannot send the service information for the SP server 200 to the mediation server 100, as a result of which the user cannot receive the provision of the first service from the SP server 200.

On the other hand, when accepting the reset operation by the user (YES in S10 of FIG. 8, T960 of FIG. 14), the printer 10 of the present embodiment resets the communication setting (S18, T962) without deleting the access token AT1 in the case where the service counter 44 is "1" (NO in S112, T962). In this case, when the communication setting of the printer 10 is set again by the user thereafter, the printer 10 can execute communication with the mediation server 100 by using the access token AT1. That is, the printer 10 can send the service information for the SP server 200 to the mediation server 100. As a result, the user can suitably receive the provision of the first service from the SP server 200.

(Corresponding Relationships)

The service counter 44 being "1" or more is an example of "selection information".

T763, T764 of FIG. 13 are respectively examples of "store selection information in the memory in a case where one or more service providing servers are selected by a user" and "send the first authentication information in the memory and first related information being related to the communication device to the specific server in a case where the selection information is stored in the memory". S112 of FIG. 8 is an example of "determine whether the selection information is stored in the memory in a case where a deletion instruction for instructing deletion of information in the memory is acquired". S16 of FIG. 8 and T1118 of FIG. 14 are examples of "delete the first authentication information in the memory in a case where it is determined that the selection information is not stored in the memory".

(Variant 1) The printer 10 may store a service flag indicating a value which is one of "ON", which indicates that a number of services which the user of the printer 10 is using among the services provided by the plurality of SP servers including the SP servers 200, 300 is one or more, and "OFF", which indicates that the number of such services is zero. In this variant, the CPU 32 of the printer 10 determines whether the service flag is ON or not in S12 of FIG. 8. The CPU 32 of the printer 10 proceeds to S14 in a case where the service flag is ON, and proceeds to S18 in a case where the service flag is OFF. In this variant, the service flag is an example of "selection information".

(Variant 2) Instead of S112 of FIG. 8, the CPU 32 of the printer 10 in the second embodiment may execute a process to determine whether or not a target OID other than the target OID "OID1" corresponding to the service ID "default" is registered in the third service table 42 (see FIG. 12). In this variant, the CPU 32 proceeds to S18 in a case where a target OID other than the target OID "OID1" is registered in the third service table 42, and proceeds to S14 in a case where only the target OID "OID1" is registered in the third service table 42. In this variant, the service counter 44 may be omitted. In this variant, the target OID "OID1" is an example of "selection information".

(Variant 3) In the reset process of FIG. 8, the process of S14 may be omitted. That is, the process of "determine whether the function information indicates that the server usage function is enabled in the case where the deletion instruction is acquired" may be omitted.

(Variant 4) The SP server 200 may be "specific server" and "first service providing server". A process to register information for receiving the provision of the service from the SP service 200 in this variant will be described. The user of the printer 10 registers information for receiving the provision of the service from the SP server 200 by using the mobile terminal 50. Firstly, processes same as T410 to T426 of FIG. 10 are executed between the mobile terminal 50 and the SP server 200. Then, when the mobile terminal 50 accepts the registration operation to register the first service on the user page by the user, it sends a registration request to the SP server 200. When the SP server 200 receives the registration request from the mobile terminal 50, it generates a PIN code, and stores the account information AC1 and the PIN code in association with each other. When the mobile terminal 50 receives the PIN code from the SP server 200, it displays the PIN code. When the printer 10 accepts the input of the PIN code by the user, it sends the PIN code and the device information of the printer 10 to the SP server 200. When the SP server 200 receives the device information from the printer 10, it generates an access token AT4 for authenticating the printer 10, and stores the account information AC1, the device information, and the access token AT4 in association with each other. Then, the SP server 200 sends a registration completion notification and the access token AT4 to the printer 10. When the printer 10 receives the registration completion notification and the access token AT4, it causes the memory 34 to store the access token AT4. After this, processes same as T162, T164 of FIG. 5 are executed except that the communication target is the SP server 200. Due to this, the printer 10 can send the service information including the MIB value corresponding to the target OID "OID2" at the sending timing of "every 12 hours".

In this variant, when accepting the reset operation by the user (YES in S10 of FIG. 8), the printer 10 resets the communication setting without deleting the access token AT4 (S18) in the case where the first service table 40 includes the service ID "service1" (YES in S12). In this case, when the communication setting of the printer 10 is set again by the user thereafter, the printer 10 can execute communication with the SP server 200 by using the access token AT4. Thus, the user can suitably receive the provision of the first service from the SP server 200. In this variant, the access token AT4 is an example of "first authentication information".

(Variant 5) "Communication device" is not limited to the printer 10, and may, for example, be a scanner, an MFP, or a stationary PC, or a server.

(Variant 6) In the above embodiments, the respective processes executed by the controller 30 are implemented by software (that is, the program 36), however, at least one of these processes may be implemented by hardware such as a logic circuit.

What is claimed is:

1. A communication device comprising:
a processor; and
a memory storing computer-readable instructions therein, the computer-readable instructions, when executed by the processor, causing the communication device to:
receive, from a specific server, first authentication information generated by the specific server;
store the first authentication information in the memory in a case where the first authentication information is received from the specific server;
store selection information in the memory in a case where one or more service providing servers are selected by a user, the selection information indicating that the one or more service providing servers have been selected;
send the first authentication information in the memory and first related information being related to the communication device to the specific server in a case where the selection information is stored in the memory, wherein in a case where the first authentication information and the first related information are sent to the specific server, the first related information is received by a first service providing server among the one or more service providing servers, and the first service providing server provides a first service to the user by using the first related information;
determine whether the selection information is stored in the memory in a case where a deletion instruction for instructing deletion of information in the memory is acquired; and
delete the first authentication information in the memory in a case where it is determined that the selection information is not stored in the memory, wherein the first authentication information is not deleted in a case where it is determined that the selection information is stored in the memory.

2. The communication device as in claim 1, wherein
the memory stores function information indicating whether a server usage function is enabled, the server usage function being for the communication device to use the specific server,
the computer-readable instructions, when executed by the processor, further cause the communication device to:
determine whether the function information indicates that the server usage function is enabled in the case where the deletion instruction is acquired,
wherein the first authentication information is deleted in a case where it is determined that the selection information is not stored in the memory and it is determined that the function information indicates that the server usage function is not enabled, and
the first authentication information is not deleted in a case where it is determined that the function information indicates that the server usage function is enabled.

3. The communication device as in claim 1, wherein
the computer-readable instructions, when executed by the processor, further cause the communication device to:
receive an information identifier for identifying the first related information from the specific server in a case where the first service providing server is selected by the user; and
store the information identifier in the memory in a case where the information identifier is received,
wherein the first authentication information in the memory and the first related information identified by the information identifier in the memory are sent to the specific server.

4. The communication device as in claim 3, wherein
the computer-readable instructions, when executed by the processor, further cause the communication device to:
receive a predetermined notification from the specific server in a case where a termination of provision of the first service is selected by the user in a terminal device different from the communication device; and
delete the first related information in the memory in a case where the predetermined notification is received from the specific server, wherein the first authentication information is not deleted from the memory even in the case where the predetermined notification is received from the specific server.

5. The communication device as in claim 4, wherein
the computer-readable instructions, when executed by the processor, further cause the communication device to:
send the first authentication information in the memory and second related information being related to the communication device to the specific server in the case where the selection information is stored in the memory, the second related information being different from the first related information,
wherein the specific server sends the second related information to a second service providing server among the one or more service providing servers, in a case where the first authentication information and the second related information are received from the communication device, the second service providing server being different from the first service providing server, and
the second service providing server provides a second service different from the first service to the user by using the second related information.

6. The communication device as in claim 1, wherein
the computer-readable instructions, when executed by the processor, further cause the communication device to:
receive one or more server identifiers for identifying the one or more service providing servers from the specific server,
wherein the selection information includes the one or more server identifiers.

7. The communication device as in claim 1, wherein the selection information includes information indicating a number of the one or more service providing servers selected by the user.

8. The communication device as in claim 1, wherein the specific server is configured separately from the first service providing server, and
the specific server sends the first related information to the first service providing server in a case where the first authentication information and the first related information are received from the communication device.

9. The communication device as in claim 8, wherein the first authentication information is different from second authentication information that is stored in the specific server and that is generated by the first service providing server, and
the specific server sends the second authentication information and the first related information to the first service providing server in the case where the first authentication information and the first related information are received from the communication device.

10. A non-transitory computer-readable recording medium storing computer-readable instructions for a communication device,
wherein the computer-readable instructions, when executed by a processor of the communication device, cause the communication device to:
receive, from a specific server, first authentication information generated by the specific server;
store the first authentication information in a memory of the communication device in a case where the first authentication information is received from the specific server;
store selection information in the memory in a case where one or more service providing servers are selected by a user, the selection information indicating that the one or more service providing servers have been selected;
send the first authentication information in the memory and first related information being related to the communication device to the specific server in a case where the selection information is stored in the memory, wherein in a case where the first authentication information and the first related information are sent to the specific server, the first related information is received by a first service providing server among the one or more service providing servers, and the first service providing server provides a first service to the user by using the first related information;
determine whether the selection information is stored in the memory in a case where a deletion instruction for instructing deletion of information in the memory is acquired; and
delete the first authentication information in the memory in a case where it is determined that the selection information is not stored in the memory, wherein the first authentication information is not deleted in a case where it is determined that the selection information is stored in the memory.

11. A method performed by a communication device, the method comprising:
receiving, from a specific server, first authentication information generated by the specific server;
storing the first authentication information in a memory of the communication device in a case where the first authentication information is received from the specific server;
storing selection information in the memory in a case where one or more service providing servers are selected by a user, the selection information indicating that the one or more service providing servers have been selected;
sending the first authentication information in the memory and first related information being related to the communication device to the specific server in a case where the selection information is stored in the memory, wherein in a case where the first authentication information and the first related information are sent to the specific server, the first related information is received by a first service providing server among the one or more service providing servers, and the first service providing server provides a first service to the user by using the first related information;
determining whether the selection information is stored in the memory in a case where a deletion instruction for instructing deletion of information in the memory is acquired; and
deleting the first authentication information in the memory in a case where it is determined that the selection information is not stored in the memory, wherein the first authentication information is not deleted in a case where it is determined that the selection information is stored in the memory.

* * * * *